US 8,085,148 B2

(12) United States Patent
Reed et al.

(10) Patent No.: US 8,085,148 B2
(45) Date of Patent: Dec. 27, 2011

(54) MOBILE MONITORING AND ALERT SYSTEM

(75) Inventors: Jaime C. Reed, Mukwonago, WI (US); Samuel K. Foos, Big Bend, WI (US); Anthony S. Fischer, Mukwonago, WI (US)

(73) Assignee: Monster Medic, Inc., Brookfield, WI (US)

( * ) Notice: Subject to any disclaimer, the term of this patent is extended or adjusted under 35 U.S.C. 154(b) by 312 days.

(21) Appl. No.: 12/268,847

(22) Filed: Nov. 11, 2008

(65) Prior Publication Data
US 2010/0117826 A1    May 13, 2010

(51) Int. Cl.
*G08B 13/14* (2006.01)
(52) U.S. Cl. .................................. 340/572.1
(58) Field of Classification Search ........... 340/572.1, 340/572.4, 572.8, 571, 568.1, 540, 539.1, 340/539.11, 10.1; 235/385, 492; 713/189
See application file for complete search history.

(56) References Cited

U.S. PATENT DOCUMENTS

| | | | | |
|---|---|---|---|---|
| 5,892,441 | A * | 4/1999 | Woolley et al. | 340/539.26 |
| 7,673,152 | B2 * | 3/2010 | Shirakawa et al. | 713/189 |
| 7,733,224 | B2 * | 6/2010 | Tran | 340/540 |
| 2008/0157972 | A1 * | 7/2008 | Duron et al. | 340/572.1 |
| 2009/0002174 | A1 * | 1/2009 | Kukita et al. | 340/572.4 |
| 2010/0090802 | A1 * | 4/2010 | Nilsson et al. | 340/10.1 |

* cited by examiner

*Primary Examiner* — Van T. Trieu
(74) *Attorney, Agent, or Firm* — Andrus, Sceales, Starke & Sawall, LLP

(57) ABSTRACT

The present invention relates to monitoring and alert systems and methods of using the same. In particular, the present invention provides transportable and vehicle interchangeable monitoring and alert systems (e.g., comprising a receiver and one or a plurality of tags (e.g., for alerting an emergency medical services (EMS) responder (e.g., emergency medical technician (EMT), firefighter, or other type of responder) that an article has been left behind at a response scene)) and methods of using the same.

18 Claims, 3 Drawing Sheets

MOBILE MONITORING AND ALERT SYSTEM

FIELD OF THE INVENTION

The present invention relates to monitoring and alert systems and methods of using the same. In particular, the present invention provides transportable and vehicle interchangeable monitoring and alert systems (e.g., comprising a receiver and one or a plurality of tags (e.g., for alerting an emergency medical services (EMS) responder (e.g., emergency medical technician (EMT), firefighter, or other type of responder) that an article has been left behind at a response scene)) and methods of using the same.

BACKGROUND OF THE INVENTION

The scene of an accident, trauma scene or medical emergency is chaotic and hectic. Many times EMS (e.g., EMTs) responders leave items behind at a scene. Some items that are left behind may be hazardous such as drug bags containing medications, needles, medical equipment, etc. Responders generally identify that an item has been left behind at a response scene when it is not available at a subsequent scene or during a shift change when a manual inventory of the items alerts an individual of the absence of one or more items. However, the identification that an item has gone missing at either of these two events causes problems. For example, taking an inventory of the items in an ambulance may show that an item is missing but provides no information regarding where the item may be (e.g., the item could have been left at any site visited throughout a shift). It would be difficult to determine where the item has been left if it is at the end of the shift and the ambulance has gone on many different calls. By the time it is determined that the item is missing it is generally too late to determine its location. It may also be detrimental to a subject needing treatment (e.g., with a medication present in a drug bag) at a scene subsequent to an item (e.g., a drug bag) being left behind at a previous scene.

SUMMARY OF THE INVENTION

The present invention relates to monitoring and alert systems and methods of using the same. In particular, the present invention provides transportable and vehicle interchangeable monitoring and alert systems (e.g., comprising a receiver and one or a plurality of tags (e.g., for alerting an emergency medical services (EMS) responder (e.g., emergency medical technician (EMT), firefighter, or other type of responder (e.g., police officer)) that an article has been left behind at a response scene)) and methods of using the same.

Accordingly, in some embodiments, the present invention provides a monitoring and alert system comprising: a receiver, wherein the receiver does not broadcast information over a radio frequency; and one or a plurality of tags, wherein the one or plurality of tags are separately attached to one or a plurality of items, wherein the tags discontinuously broadcast unique identification information over a radio frequency. In some embodiments, the receiver is configured to receive and process broadcasted unique identification information from one or a plurality paired tags, and not to receive or process radio frequency information broadcasted from non-paired tags. In some embodiments, the system is utilized to wirelessly tether objects to a vehicle. The present invention is not limited by the type of item wirelessly tethered to a vehicle nor to the type of vehicle. In some embodiments, the item is a drug bag, a suction pump, an automated external defibrillator, pulse oximeter, monitor (e.g., multi-parameter monitor), patient transport cot, purse, wallet, phone, money clip, basketball, football, motorcycle helmet, gun, computer, personal digital assistant, phone, (e.g., smart phone), hand cuffs, etc. (e.g., any type of item that is transported in a vehicle to a location, that can be removed from the vehicle at the location, and placed back into the vehicle prior to departure of the vehicle from the scene). Similarly, the present invention is not limited by a type of vehicle in which the systems and methods of the invention are used. Indeed, systems and methods of the present invention can be utilized in a wide variety of vehicles including, but not limited to, cars, ambulances, fire trucks and other types of trucks, boats, all-terrain vehicles, recreational utility vehicles, etc. In some embodiments, an accessory outlet located in the vehicle (e.g., a 12V outlet, a 24V outlet, etc) is utilized to power the receiver. In some embodiments, the system is transportable from on vehicle to another. In some embodiments, the unique identification information broadcast by each tag is a number or a letter that uniquely identifies each item. In some embodiments, the unique identification information of each tag is transmitted once every set period of time (e.g., the present invention is not limited by any particular set period of time, the set period of time could be every about 3, 4, 5, 6, 7, 8, 9, 10, 11, 12, 13, 14, 15, 20, 30 or more seconds). In some embodiments, the receiver, in the absence of the receiver receiving broadcast information from a paired tag in a pre determined period of time, identifies an item as being out of range of the receiver. In some embodiments, the receiver provides an audio and/or visual notification when an item is identified as being out of range of the receiver. In some embodiments, the one or plurality of tags transmit unique identification information at a frequency of 315 MHz. In some embodiments, the transmitters comprise a power source (e.g., a lithium battery (e.g., a 3V lithium battery)), a radio frequency transmitter circuit and a microprocessor. In some embodiments, the frequency transmitter utilizes amplitude shift keying (ASK) or carrier present carrier absent modulation, or other type of transmission disclosed herein.

The present invention also provides a method of wirelessly tethering one or a plurality of items to a vehicle comprising: providing: a monitoring and alert system comprising: a receiver, wherein the receiver is connected to the vehicle and does not broadcast information over a radio frequency; and one or a plurality of tags, wherein the one or plurality of tags are separately attached to one or a plurality of items, wherein the tags discontinuously broadcast unique identification information over a radio frequency; wherein the receiver is configured to receive and process broadcasted unique identification information from one or a plurality paired tags, and not to receive or process radio frequency information broadcasted from non-paired tags, and wherein when the receiver fails to receive a broadcasted signal from one or a plurality of paired tags the receiver provides an alert that an item is beyond a predefined distance from the vehicle. In some embodiments, the receiver is connected to the vehicle via a 12V accessory outlet. In some embodiments, the alert comprises an audio alert and/or a visual alert.

DEFINITIONS

Figure 1:
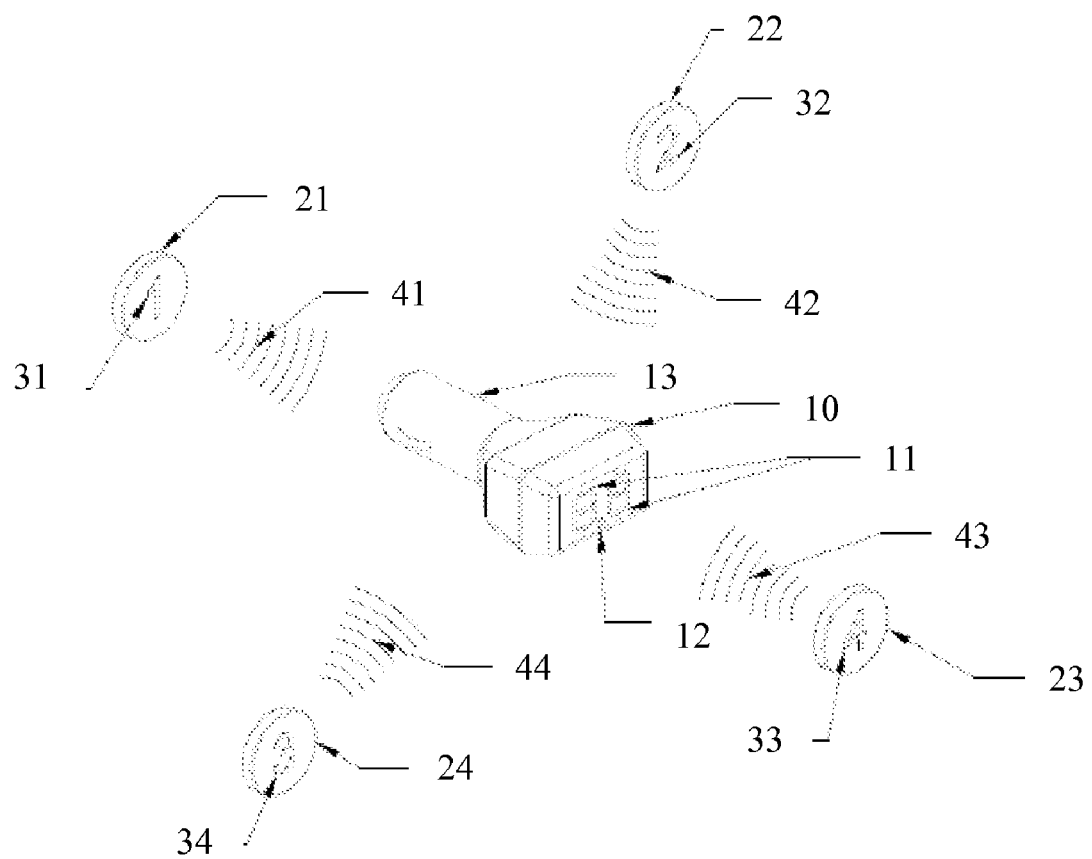
FIG. 1 shows a diagram of components of a monitoring and alert system of the present invention.

As used herein, the terms "emergency response scene," "emergency scene," and the like are used interchangeably to refer to the scene of an accident, a trauma scene, a scene of a medical emergency, a crime scene, a natural, accidental or intentional disaster scene, and other types of scenes upon which an individual (e.g., an emergency responder (e.g., including, but not limited to, an emergency medical services (EMS) responder, firefighter, police officer, national guard officer, etc.)) arrives. Such scenes are often characterized by disorder and chaos. In addition, individuals arriving at a scene are often interested in and/or required to spend as little time as possible at the scene (e.g., leading to an increase in the likelihood that one or more items taken to a scene by a responder may be accidentally left behind).

As used herein, the terms "transmitter," "tag" and the like are used interchangeably to describe a portion of a system of the invention that broadcasts a signal (e.g., a radio signal (e.g., at one or more frequencies)). The signal may be a continuous radio frequency signal or an intermittent radio frequency signal. Each of the one or more tags/transmitters can be configured to transmit a specific identification number. For example, in some embodiments, the identification number is a three byte hex number (e.g., encoding numbers (e.g., binary and/or decimal numbers), letters and/or other type of identifier). In some embodiments, the tags/transmitters are configured to transmit a one byte, two byte, three byte, four byte, five byte, six byte or more (e.g., seven, eight, nine or more byte) identification number.

DETAILED DESCRIPTION OF THE INVENTION

The present invention relates to monitoring and alert systems and methods of using the same. In particular, the present invention provides transportable and vehicle interchangeable monitoring and alert systems (e.g., comprising a receiver and one or a plurality of tags (e.g., for alerting an emergency medical services (EMS) responder (e.g., emergency medical technician (EMT), firefighter, or other type of responder (e.g., police officer)) that an article has been left behind at a response scene)) and methods of using the same.

The present invention provides a cost effective system and method of using the same to notify a person of items/articles left at a scene (e.g., a scene of a medical emergency). For example, in some embodiments, the present invention provides a system that comprises a receiver and one or more tags/transmitters (e.g., wherein each of the one or more tags are attached and/or affixed to a separate item or article (e.g., an item or article used in an emergency vehicle (e.g., a drug bag, stretcher, immobilization board, etc.))). In some embodiments, the system is transportable, in part or in total, from one vehicle to another. For example, in some embodiments, a user of a system transports an entire system comprising a receiver and tagged items from one vehicle to another (e.g., from one ambulance to another ambulance). In some embodiments, a user of a system transports only a portion of the system (e.g., only the receiver, only the tagged items, or only a portion of the tagged items, from one vehicle to another (e.g., as described herein, tagged items may be moved from one vehicle to another and "paired" with a separate receiver in the other vehicle).

In some embodiments, the receiver utilizes a 12V accessory outlet located in a vehicle (e.g., an ambulance, fire truck, or other type of vehicle (e.g., in which an emergency responder may use for travel to and from an emergency response scene)) to power the system. In some embodiments, each of the one or more tags broadcasts a radio signal. The present invention is not limited by the type of radio signal transmitted. Indeed, a variety of radio signals may be transmitted including but not limited to those described herein. In some embodiments, each tag broadcasts a radio frequency signal that is detected and associated with the specific tag (e.g., each tag transmits specific identification information (e.g., RFID), each tag transmits a different radio frequency, or each tag transmits specific identification information that is broadcast at one or more different radio frequencies). Thus, in some embodiments, each of the one or more tags is configured to broadcast a signal that is unique to the tag transmitting the signal (e.g., thereby allowing a user of the system to identify which tag, and therefore what item, is missing).

In some embodiments, a system of the invention comprises components as shown in FIG. 1. For example, the system comprises a receiver 10 and one or more tags 21, 22, 23, 24, each tag configured to transmit unique information identifying the tag 31, 32, 33, 34. In some embodiments, the unique information 31, 32, 33, 34 of each tag 21, 22, 23, 24 is a number or a letter identifying the tag (e.g., a numeral from 0-99, or a letter of the alphabet). The present invention is not limited by the number of tags utilized (e.g., each of which transmits unique information about the tag (e.g., RFID)) for labeling and/or for attachment to one or more articles/items. For example, a single receiver can be paired with 1, 2, 3, 4, 5, 6, 7, 8, 9, 10, 11, 12, 13, 14, 15 or more (e.g., 20, 25, or more) tags. In some embodiments, unique identification information 31, 32, 33, 34 (e.g., RFID) of each tag 21, 22, 23, 24 is transmitted 41, 42, 43, 44 once during a certain period of time (e.g., once every 3 seconds, once every 5 seconds, once every 10 seconds, etc.). If the receiver 10 to which the tag 21, 22, 23, 24 is paired does not receive the transmitted information 41, 42, 43, 44 from the transmitter 21, 22, 23, 24 in a pre determined period of time (e.g., a time that equals or that is greater than the period of time the transmitted information is sent from the tag), the tag 21, 22, 23, 24, and therefore the item to which the tag 21, 22, 23, 24 is attached, is identified by the receiver 10 as being out of range of the receiver 10. In some embodiments, an item that is identified as being out of range of the receiver 10 is identified as an item outside a predefined distance from the receiver (e.g., from a receiver located in a 12V receptacle of a vehicle (e.g., an article transported to a scene in the vehicle, used outside of the vehicle at the scene, and accidentally been left behind after the vehicle has departed the scene)). In some embodiments, a receiver 10 has a display 11 (e.g., a two-digit display) that provides a visual display of the tag 21, 22, 23, 24 that is not in range of the receiver 10 (e.g., that has been accidentally left behind). Thus, when a tag 21, 22, 23, 24 is out of range of the receiver 10, the display identifies which tag(s) is out of range (e.g., by number (e.g., 0-99) or letter (e.g., A-Z)).

In some embodiments, each tag transmits information (e.g., unique identification information (e.g., RFIDs) at the same radio frequency. The present invention is not limited by the radio frequency utilized. In some embodiments, the frequency is 315 MHz. In some embodiments, the frequency is a frequency below 315 MHz (e.g., 10-315 MHz) or greater than 315 MHz (e.g., 315 MHz-2 GHz, or more). In some embodiments, each transmitter comprises a power source (e.g., a lithium battery (e.g., a 3V lithium battery)), a RF transmitter circuit and a microprocessor. In some embodiments, the RF transmitter is an amplitude modulated radio frequency generator. In some embodiments, the RF transmitter is a frequency modulated radio frequency generator. In some embodiments, an RF transmitter of the invention utilizes amplitude shift keying (ASK) or carrier present carrier absent modulation. In some embodiments, a RF transmitter of the invention utilizes frequency shift keying (FSK) or pulse width modulation (PWM). In some embodiments, the microprocessor is an eight bit or more (e.g. 16 bit, 32 bit, etc.) microprocessor. In some embodiments, the microprocessor is a FREESCALE MC9S08SH8 8 bit 8 K microcontroller, or similar device. In some embodiments, a transmitter sends out a signal (e.g., digital signal) using carrier on carrier off modulation. In some embodiments, the transmitter is configured to transmit signal once every second, once every two seconds, once every three seconds, once every four seconds, once every 5 seconds, or more (e.g., 10 seconds, 20 seconds, 30 seconds or more). In some embodiments, a transmitter transmits its unique identification information once about every 3 seconds. In some embodiments, a transmitter broadcasts its signals over a distance of about $1/16^{th}$ of a mile, about $1/8^{th}$ of a mile, about 1/4 mile, 1/3 mile, 1/2 mile or more. In some embodiments, a transmitter transmits information over a distance of less than about $1/16^{th}$ of a mile (e.g., about $1/32^{nd}$ of a mile or less).

In some embodiments, a group of transmitters (e.g., 2, 3, 4, 5, 6, 7, 8 or more, each configured to send specific unique identification information) is utilized to label a plurality of articles associated with a single emergency response vehicle (e.g., an ambulance, a fire truck, a police car, etc.). In some embodiments, the present invention provides a plurality of systems, each system comprising a receiver and group of transmitters. In some embodiments, the present invention provides a plurality of systems wherein each individual system (e.g., comprising a receiver and plurality of transmitters) uses specific identification information (e.g., one system utilizes identification information that is distinct from identification information of a second system (e.g., system 1 utilizes identification information (e.g., RFIDs) identifying tags as numbers 0 through 14, system 2 utilizes identification information (e.g., RFIDs) identifying tags as numbers 15 through 30, system 3 utilizes identification information (e.g., RFIDs) identifying tags as numbers 31 through 45, system 4 utilizes identification information (e.g., RFIDs) identifying tags as numbers 46 through 60, and so on). Thus, the present invention provides systems that reduce and/or eliminate the chance of a receiver from one vehicle (e.g., ambulance, fire truck, etc.) interpreting/receiving a signal from a tag of another vehicle (e.g., ambulance, fire truck, etc.) as being one it should be looking for. For example, if there are two or more vehicles (e.g., ambulances, fire trucks, etc.) utilizing a system of the invention, wherein the receiver of a system present in each vehicle is within the range of transmitters present in the other vehicle (e.g., system 1 transmitters are in proximity to transmit signal to a receiver of system 2, and system 2 transmitters are in proximity to transmit signal to a receiver of system 1), the specific identification information of system 1 (e.g., RFIDs of system 1) does not cross-talk or otherwise interfere with specific identification information of system 2 (e.g., RFIDs of system 2) (e.g., the identification information (e.g., RFIDs) identifying tags of system 1 (e.g., as numbers 0 through 14) are unique from the identification information (e.g., RFIDs) identifying tags of system 2 (e.g., numbers 15-30)). Thus, the present invention provides systems and methods for monitoring and/or preventing loss of items (e.g., equipment) present in a plurality of vehicles that frequently arrive at the same emergency response scene (e.g., because the plurality of vehicles at the same response scene each possess a system with unique identification information (e.g., identification numbers do not match), receivers present in each of the vehicles only "see" transmitted tags from its "paired" group of tags and ignore and/or are oblivious to transmitted tags from a separate system).

Figure 2:
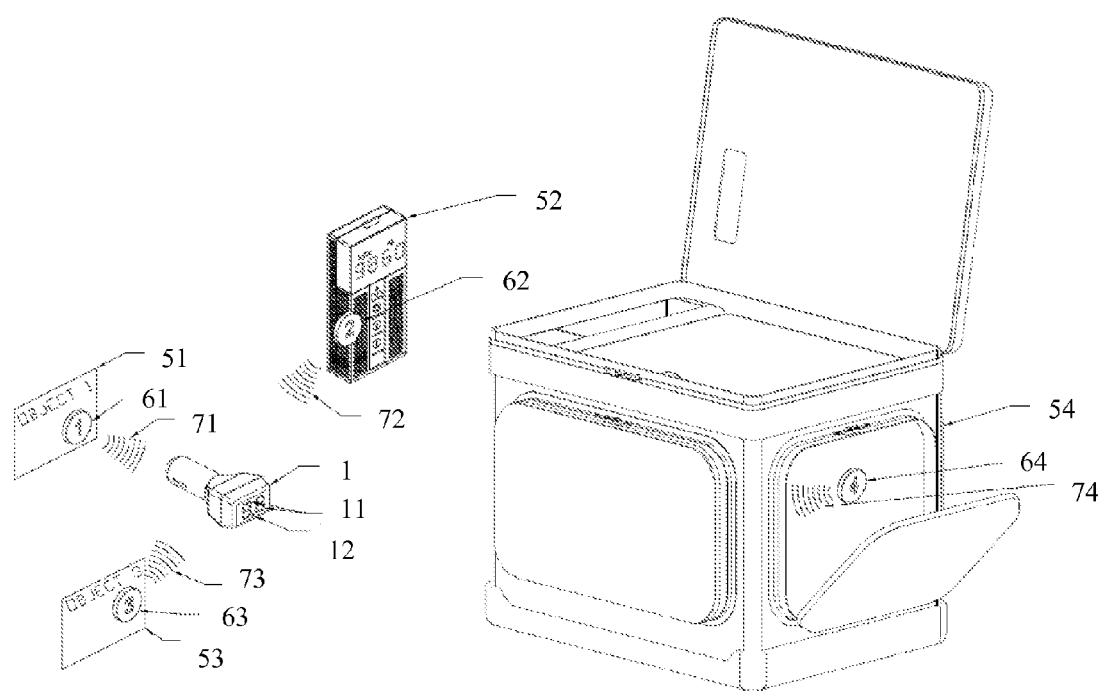
FIG. 2 shows a diagram of components of a monitoring and alert system and objects to which tags can be affixed in some embodiments of the invention.
Figure 3:
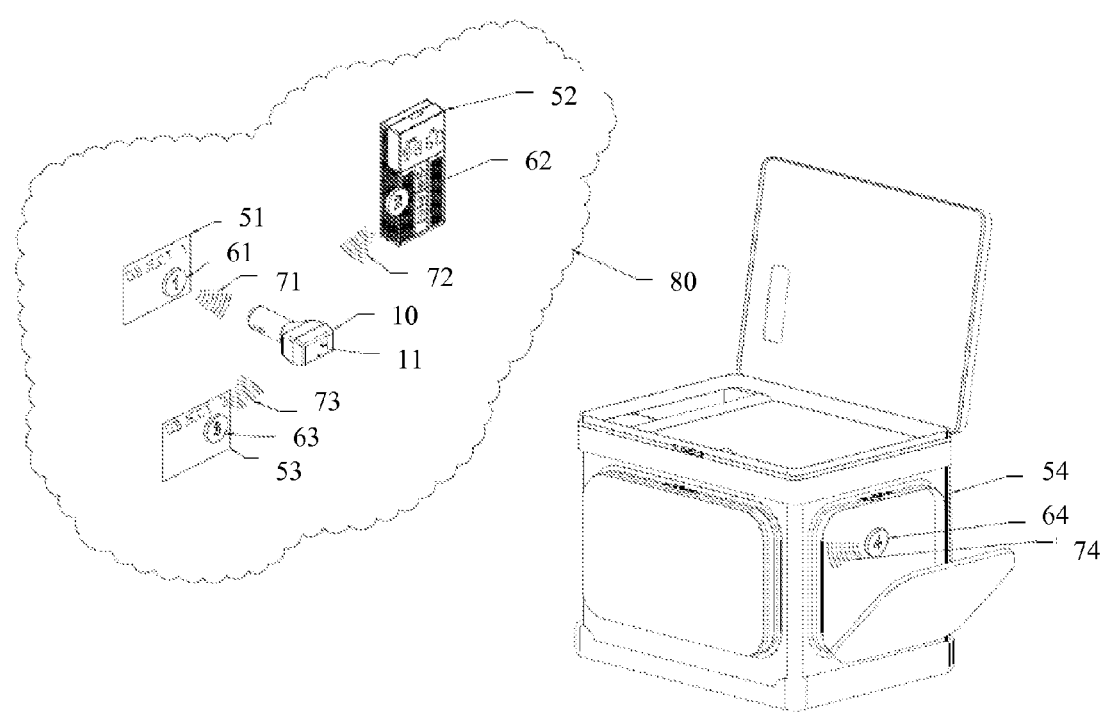
FIG. 3 illustrates an event in which an object is left behind at an emergency response scene and the tag is outside the range of the receiver.

As shown in FIGS. 1-3, in some embodiments, a receiver 10 comprises a housing that fits into a 12V accessory receptacle 13 (e.g., that is utilized to supply power to the device). The receiver 10 comprises a RF receiver circuit, microprocessor, buzzer circuit and display. In some embodiments, the receiver is configured to receive RF signals of 315 MHz. In some embodiments, the receiver is configured to receive a frequency below 315 MHz (e.g., 10-315 MHz) or greater than 315 MHz (e.g., 315 MHz-2 GHz, or more). In some embodiments, the receiver is an amplitude shift keying (ASK) receiver and/or a carrier absent carrier present super heterodyne receiver. In some embodiments, the receiver decodes carrier on carrier off modulation. In some embodiments, a signal received is sent to the microprocessor as digital information. The microprocessor (e.g., FREESCALE MC9S08SH8 8 bit 8 K microcontroller) interprets and/or characterizes the digital information to identify the transmitter from which the signal was received. The present invention is not limited by the type of microcontroller utilized. For example, in some embodiments, the microprocessor is any microcontroller with a communication port, memory and IO ports. In some embodiments, a receiver 10 that is paired with a transmitter 21, 22, 23, 24 allows for missing data (e.g., to negate the effects of collision of data by two or more transmitters). For example, in some embodiments the receiver is configured to not activate an alarm if it misses one or more (e.g., two, three or more) transmissions of a tag's ID number. Thus, in some embodiments, a receiver is configured such that the receiver needs to miss two consecutive ID transmissions from a tag before it sounds an alarm signaling that the tag is missing. If interference (e.g., two tags transmitting at the same time, other RF interference, etc.) disrupts one transmission of the tag ID, the alarm is not activated until a second, third or more transmission is missed (e.g., if two consecutive tag ID transmissions are not detected and/or missed, then the receiver sounds an alarm (e.g., the buzzer circuit is activated) and/or activates a visual alert alerting a user that a tag is out of range).

In some embodiments, the receiver has a learning mode (e.g., a "pairing" mode). The learning mode pairs the transmitters 21, 22, 23, 24 to the receiver 10. In some embodiments, a user presses a button 12 on the receiver 10, thereby instructing the receiver 10 to look, for a set period of time (e.g., 10 seconds, 20 seconds, 30 seconds or more), for transmitters 21, 22, 23, 24 in range. It is preferred that the transmitter "looks" for each transmitter for a period of time that is greater than the amount of time for each transmitter to broadcast it unique identification information (e.g., RFID) at least once, twice, three times, four times, or more. As described herein, each transmitter 21-24 is configured to broadcast unique identification information (e.g., a unique RFID (e.g., a number)). The receiver comprises a display capable of displaying identification information (e.g., a number or letter) of each transmitter found. In some embodiments, after the set period of time has elapsed during which the receiver "looks" for transmitter signal, the receiver displays in succession the unique identification information (e.g., number or letter) on the display for each transmitter that was found in the pairing process (e.g., thereby enabling a user to confirm that all of the transmission tags were found).

An example of how a system, in some embodiments of the invention, is utilized is depicted in FIGS. 2 and 3. As shown in FIG. 2, the system comprises a receiver 10 (e.g., comprising a display 11 and a pairing button 12), and a plurality of items 51, 52, 53, 54, each comprising a transmitter 61, 62, 63, 64 attached and/or affixed thereto. Each transmitter is configured to transmit a signal/unique identification information 71, 72, 73, 74 (e.g., radio frequency identification information (e.g., RFID)). The receiver 10 is plugged into a 12V outlet in a vehicle that contains the tagged items 51, 52, 53, 54. The items 51, 52, 53, 54 may already be paired with the receiver 10, or a user pairs the items 51, 52, 53, 54 with the receiver by pressing the pairing button 12 on the receiver 10. When all of the paired items 51. 52. 53, 54 are within range of the receiver 10 (e.g., where the receiver 10 is within a distance from the tags 61, 62, 63 64 to receive transmitted signal 71, 72, 73 74 from the tags), the receiver does not provide any type of alert to a user (e.g., as shown in FIG. 2). However, if a user of the system removes one of the items from the vehicle (e.g., at an emergency scene (e.g., item 54 (e.g., a drug bag)), and fails to place the item 54 back into the vehicle prior to leaving the location where the item 54 was removed, once the vehicle drives a distance away from the scene that is greater than the distance the transmitter 64 is capable of transmitting its signal 74 to the receiver 10 (e.g., depicted in FIG. 3 as 80, the receiver 10 identifies the absence of signal 74 from the tag 64 associated with the item 54 (e.g., as depicted in FIG. 3). In some embodiments, when the absence of a signal from a paired tag is detected by a receiver 10, the receiver 10 displays unique identification information on the display 11. In some embodiments, when the absence of a signal from a paired tag is detected by a receiver 10, the receiver 10 activates a buzzer circuit thereby providing an audio as well as visual alert that an item is not in range of the receiver.

The present invention is not limited by the type of item or article that is "tagged" with a transmitter. Indeed, a variety of items can be tagged including, but not limited to, a drug bag, a suction pump, an automated external defibrillator, pulse oximeter, monitor (e.g., multi-parameter monitor), patient transport cot, purse, wallet, phone, money clip, basketball, football, motorcycle helmet, gun, computer, personal digital assistant, phone, (e.g., smart phone), hand cuffs, etc. (e.g., any type of item that is transported in a vehicle to a location, removed from the vehicle at the location, and placed back into the vehicle prior to departure from the scene). Similarly, the present invention is not limited by a type of vehicle in which the systems and methods of the invention find use. Indeed, systems and methods of the present invention can be utilized in a wide variety of vehicles including, but not limited to, cars, ambulances, fire trucks and other types of trucks, boats, all-terrain vehicles, recreational utility vehicles, etc.

Thus, the present invention provides systems and methods useful for notifying an individual (e.g., an EMS responder (e.g., an EMT, fireman, etc.) that certain items taken to a scene have been left behind during departure from the scene. Thus, the present invention provides systems and methods useful for eliminating replacement costs of these and other types of items that may be left behind. In some embodiments, the present invention is utilized to monitor illicit and/or illegal activity (e.g., theft from vehicles, etc.).

Thus, the present invention provides significant advantages over other devices. For example, some devices on the market require a user to press a button or have interaction with a device to find a missing object. However, such devices prove useless in situations when a user is unaware that an object is missing (e.g., when an object has been accidentally left behind at a scene). Thus, systems of the present invention do not require a user to notice an item is missing. To the contrary, systems of the present invention function to tether objects to a vehicle, thereby assisting individuals associated with the vehicle to retain items associated with the vehicle. Thus, in some embodiments, the present invention automatically and wirelessly (e.g., utilizing RFID technology), tethers the objects to a vehicle. When the wireless tether is broken the user is immediately notified as to which object has been left behind. In some embodiments, when an object returns into range of the receiver the numerical notification and buzzer are automatically extinguished notifying the user the receiver is within a certain proximity of the object.

In some embodiments, a receiver is transportable (e.g., outside the context of a vehicle). For example, in some embodiments, a receiver is powered by a battery (e.g., a lithium battery). In some embodiments, a receiver is attached to an individual (e.g., to a belt clip, or held in a pocket (e.g., like a cell phone)).

In some embodiments, when more than one tag is outside the range of hitting a receiver with a transmitted signal, the number of each tag outside the range (e.g., that is not detected by the receiver) is shown in sequence on the display of the receiver. For example, in some embodiments a receiver has a two digit LED display. The LED display shows the unique identification information (e.g., number or letter encoded in a RFID) of the out of range tag. In the case where there are multiple tags out of range the receiver displays the unique identification information (e.g., RFID) of the first out of range tag for a set period of time (e.g., 3 seconds). The receiver then displays the next out of range unique identification information (e.g., RFID) for the same set period of time, and so on for other tags out of range. The receiver cycles the representation of each tagged item on the display until the signal transmitted by the tag is received by the receiver. Once the receiver is within range of the transmission of the tag and receives the signal, the tag identification information (e.g., RFID) is removed from the list and the receiver cycles through the remaining lost/out of range tags until they are found.

In some embodiments, each transmitter broadcasts a 3 byte unique identification number. As described herein, a receiver, in some embodiments, comprises a pairing button (e.g., up/down push button switch). In some embodiments, during pairing, a user puts the receiver into pairing mode (e.g., by pushing the pairing button) and selects a number and/or letter on the display to represent a specific tag/transmitter. Pressing the pairing button again pairs the tag/transmitter with the receiver. In some embodiments, a user is provided a sheet of adhesive numbers and/or letters (e.g., that can be utilized to label to the transmitter with the number or label selected). In some embodiments, if a user has a lost or broken tag the user can pair a new tag/transmitter using the same process above.

In some embodiments, software in the receiver is configured to track of the identification information (e.g., RFIDs) of each tag it is currently paired to so it will not pair the same tag into two separate locations (e.g., two number and/or letter locations). For example, in some embodiments, the first time the user pairs a group of tags to a new receiver the user powers the tags up sequentially (e.g., one by one), pairing each tag before powering the next tag. In this way, a user is able to identify each tag being paired (e.g., by number and/or letter).

In some embodiments, systems of the present invention are configured to reduce the likelihood of cross-talk (e.g., interference) between two systems. For example, in theory, it is possible for 1 tag/transmitter to be paired to two receivers if the unique identification information (e.g., RFID) of both tags match. However, the probability that two systems with a tag that has the same unique identification information (e.g., RFID) and are in range is improbable due to the large number of combinations generated using a three byte hex ID scheme. Thus, for example, in some embodiments where the unique identification information (e.g., RFID) comprises a three byte hex number, each byte is a hex value from 00 to FF, each byte has 255 variations, resulting in 16,581,375 different unique identification information (e.g., RFID) tags.

In some embodiments, systems of the present invention reduce and/or eliminate the ability of third parties from interfering with, sabotaging, and/or sniffing transmitted signals broadcast by a transmitter. For example, in some embodiments, the output of the transmitter tag is altered by changing components in the circuit (e.g., thereby increasing or decreasing transmission range). Output may be altered to compensate for objects in the environment such as walls, doors, people etc. In some embodiments, power output in the 315 MHz band is limited to an average output of 5000 uV/M.

In some embodiments, a transmitter is configured to have a low power state where it does not transmit signal as well as an alert state wherein it transmits/broadcasts its unique identification information (e.g., RFID). In some embodiments, the tag cycles continuously through these states. In some embodiments, the transition interval between each state takes place at least 10 seconds after the last cycle (e.g., due to governmental regulations). Thus, in some embodiments, signal transmission is discontinuous. In some embodiments, cycling of the transmitter between these states significantly increases battery life (e.g., thereby extending the usable life of the system (e.g., in contrast to conventional devices that require a plurality of continuously powered receivers). In some embodiments, a transmitter comprises an alert system. In some embodiments, the alert system comprises visual (e.g., a lighted display (e.g., panel of LED lights (e.g., that illuminate when out of range of the receiver))) and/or auditory alert components.

All publications and patents mentioned in the above specification are herein incorporated by reference. Various modifications and variations of the described compositions and methods of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention that are obvious to those skilled in the relevant fields are intended to be within the scope of the present invention.

What is claimed is:

1. A monitoring and alert system comprising:
 a) a receiver, wherein the receiver does not broadcast information over a radio frequency; and
 b) one or a plurality of RFID tags, wherein the one or plurality of RFID tags are separately attached to one or a plurality of items, wherein the tags discontinuously broadcast unique identification information over a radio frequency at predetermined intervals independent of the receiver, said one or a plurality of RFID tags paired with the receiver such that the receiver recognizes the unique identification information independently broadcast by one or a plurality of paired tags;
 wherein the receiver is configured to receive and process broadcasted unique identification information from one or a plurality paired tags, and not to receive or process radio frequency information broadcasted from non-paired tags; and
 wherein the receiver, in the absence of the receiver receiving broadcast information from a paired tag in a predetermined period of time, identifies an item as being out of range of the receiver.

2. The system of claim 1, wherein the system wirelessly tethers objects to a vehicle.

3. The system of claim 2, wherein a 12V accessory outlet located in the vehicle is utilized to power the receiver.

4. The system of claim 2, wherein the system is transportable from on vehicle to another.

5. The system of claim 2, wherein the vehicle is an emergency vehicle.

6. The system of claim 1, wherein the unique identification information broadcast by each tag is a number or a letter that uniquely identifies each item.

7. The system of claim 1, wherein the unique identification information of each tag is transmitted once every 10 seconds.

8. The system of claim 1, wherein the receiver provides an audio and/or visual notification when an item is identified as being out of range of the receiver.

9. The system of claim 1, wherein the item is an item used in an emergency vehicle.

10. The system of claim 1, wherein the item is selected from the group consisting of a drug bag, a suction pump, an automated external defibrillator, a pulse oximeter, a monitor, a patient transport cot, a personal digital assistant, and a computer.

11. The system of claim 1, wherein the one or plurality of tags transmit unique identification information at a frequency of 315 MHz.

12. The system of claim 1, wherein the transmitters comprise a power source, a radio frequency transmitter circuit and a microprocessor.

13. The system of claim 12, wherein the power source is a lithium battery.

14. The system of claim 12, wherein the frequency transmitter utilizes amplitude shift keying (ASK) or carrier present carrier absent modulation.

15. A method of wirelessly tethering one or a plurality of items to a vehicle comprising:
 a) providing: a monitoring and alert system comprising:
  i) a receiver, wherein the receiver is connected to the vehicle and does not broadcast information over a radio frequency; and
  ii) one or a plurality of RFID tags, wherein the one or plurality of RFID tags are separately attached to one or a plurality of items, wherein the tags discontinuously broadcast unique identification information over a radio frequency at predetermined intervals independent of the receiver, said one or a plurality of RFID tags being paired with the receiver such that the receiver recognizes the unique identification information independently broadcast by one or a plurality of paired tags;
 wherein the receiver is configured to receive and process broadcasted unique identification information from one or a plurality paired tags, and not to receive or process radio frequency information broadcasted from non-paired tags, and wherein when the receiver fails to receive a broadcasted signal from one or a plurality of paired tags the receiver provides an alert that an item is beyond a predefined distance from the vehicle.

16. The method of claim 15, wherein the receiver is connected to the vehicle via a 12V accessory outlet.

17. The method of claim 15, wherein the alert comprises an audio alert.

18. The method of claim 15, wherein the alert comprises a visual alert.

* * * * *